(12) United States Patent
Liardet et al.

(10) Patent No.: US 8,635,460 B2
(45) Date of Patent: Jan. 21, 2014

(54) MASKING OF BINARY WORDS PROCESSED BY AN INTEGRATED CIRCUIT

(75) Inventors: Pierre-Yvan Liardet, Peynier (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 2263 days.

(21) Appl. No.: 11/304,236

(22) Filed: Dec. 14, 2005

(65) Prior Publication Data

US 2006/0125664 A1    Jun. 15, 2006

(30) Foreign Application Priority Data

Dec. 14, 2004    (FR) ...................................... 04 52968

(51) Int. Cl.
*G06F 11/30* (2006.01)
*G06F 12/14* (2006.01)

(52) U.S. Cl.
USPC ........................................................ 713/193

(58) Field of Classification Search
None
See application file for complete search history.

(56) References Cited

U.S. PATENT DOCUMENTS

| | | | | |
|---|---|---|---|---|
| 4,751,733 | A * | 6/1988 | Delayaye et al. | 380/42 |
| 6,295,606 | B1 * | 9/2001 | Messerges et al. | 713/189 |
| 6,320,964 | B1 | 11/2001 | Callum | |
| 2003/0048899 | A1 * | 3/2003 | Spacey | 380/37 |
| 2004/0028224 | A1 * | 2/2004 | Liardet et al. | 380/37 |
| 2004/0071288 | A1 * | 4/2004 | Romain et al. | 380/37 |
| 2004/0139340 | A1 * | 7/2004 | Johnson et al. | 713/194 |

OTHER PUBLICATIONS

T. S. Messerges, Securing the AES Finalists Against Power Analysis Attacks, 2001, Springer-Verlag Berlin Heidelberg, pp. 150-164.*
Hagerup, T., Fast Parallel Generation of Random Permutations, 1991, Springer Berlin/Heidelberg, vol. 510/1991, pp. 413-415.*
French Search Report from corresponding French Application No. 0452968, filed Dec. 14, 2004.
Bruce Schneier, *Applied Cryptography Second Edition*, 1996, John Wiley & Sons, XP002333190.
Menezes, Vanstone, Oorschot, *Handbook of Applied Cryptography*, 1996, CRC Press LLC, XP002333191.

* cited by examiner

*Primary Examiner* — Kambiz Zand
*Assistant Examiner* — Trong Nguyen
(74) *Attorney, Agent, or Firm* — Wolf, Greenfield & Sacks, P.C.

(57) ABSTRACT

A method and a circuit for masking a digital word by application of a random bijection, including applying at least one first operation including selecting a non-disjoint subset of the word having its position and size depending on a first random quantity, and assigning to each bit of the subset, the state of the bit having a symmetrical position with respect to the middle of the subset, to obtain a masked digital quantity.

15 Claims, 3 Drawing Sheets

MASKING OF BINARY WORDS PROCESSED BY AN INTEGRATED CIRCUIT

BACKGROUND OF THE INVENTION

1. Field of the Invention

The present invention generally relates to the handling of numbers by integrated circuits and, more specifically, to the masking of binary numbers manipulated by a processor to make these numbers undetectable.

2. Discussion of the Related Art

FIG. 2 very schematically illustrates in the form of blocks a first known example of implementation of a bijective transformation 1. According to this example, each time data DATAi must be transformed, a random number (block 10, RNG) having its result directly or indirectly providing masked data MDATAi is drawn. To avoid possible collisions (assignment of same masked data to two distinct initial pieces of data), it is checked (block 11, EXIST ?) from a correspondence table 12 whether data MDATAi have already been assigned to data to be masked. If not (N), current data MDATAi are assigned to the data to be masked. If so (Y), that is, if the drawing has already been used, a new drawing is performed by block 10.

The inverse transformation consists, from data MDATAi, to extract the corresponding data DATAi of table 12, thus forming a correspondence table reset each time a new bijection is necessary.

A disadvantage of such a solution is that the table generation requires significant calculation resources to avoid reusing values which have already been assigned.

Another disadvantage is that it requires storage of a correspondence table in a volatile memory.

FIG. 3 illustrates a second example of a known solution by a simplified representation of permutation block 1. According to this example, a constant Ct is drawn by a random generator (not shown) at each new bijection (on each circuit reset, for example). Constant Ct is combined with data DATAi to be masked by an XOR function 22 and the result provides data MDATAi. Such an XOR combination operation is involutional, same data MDATAi combined with the same constant Ct giving back initial data DATAi. The only condition is for the data and the constant to have the same size (for example, m bits).

The solution of FIG. 3 has the advantage of being simple to implement. It however has the significant disadvantage of considerably reducing the number of possible bijections for a size m of binary words. Indeed, for an m-bit word, the bijection number is limited to $2^m$, that is, the random drawing of constant Ct enables generating but a small part of the possible bijective transformations for the considered number of bits. Theoretically, the number of possible bijections for an m-bit word is the factorial of 2 at power m ($2^m!$). For example, for eight-bit words, this amounts to approximately $10^{600}$ bijections against 256 in the case of FIG. 3.

A disadvantage is the risk (linked to the number of bijections) of executions in which the same random constant Ct is drawn.

SUMMARY OF THE INVENTION

The present invention aims at overcoming the disadvantages of known solutions to perform bijective transformations between two binary numbers manipulated by an integrated circuit.

The present invention more specifically aims at providing a solution for increasing the number of usable bijective transformations.

The present invention also aims at preserving the equiprobability of the random selection of the used bijection.

The present invention also aims at providing a solution which is simple to implement and which, especially, does not require recalculating and dynamically storing a table of correspondence between the manipulated data, or between the random drawing and one of the data.

The present invention also aims at providing a solution with a temporarily fast execution to avoid adversely affecting the execution of the calculations by the circuit processing these data.

The present invention further aims, in a preferred embodiment, at providing an involutional transformation operation.

To achieve all or part of these objects, as well as others, the present invention provides a method for masking a digital word by application of a random bijection, comprising applying at least one first operation comprising:

selecting a non-disjoint subset of said word having its position and size depending on a first random quantity; and assigning to each bit of the subset the state of the bit having a symmetrical position with respect to the middle of the subset, to obtain a masked digital quantity.

According to an embodiment of the present invention, said first random quantity is used to select a representation of the first operation in a stored table, each representation in the table being unique by the concerned subset of the word.

According to an embodiment of the present invention, said table contains, for an m-bit word, $2^{m-1}$ representations of the first operation.

According to an embodiment of the present invention, a second operation of bit-to-bit combination by an XOR function with a second random quantity of same size as the word is applied before or after said first operation.

According to an embodiment of the present invention, a third operation comprising a circular permutation of the bits, a number of times conditioned by a third random quantity, is applied before or after the first or second operation.

According to an embodiment of the present invention, said third quantity comprises, for an m-bit word, $\log_2(m)$ bits.

The present invention also provides a method for unmasking digital data masked by the first operation, comprising applying, to the data to be unmasked, the same first operation conditioned by the same first random quantity.

The present invention also provides a method for unmasking digital data masked by the first two operations, comprising applying, in an inverse order, the same operations conditioned by the same random quantities.

The present invention also provides a method for unmasking digital data masked by the three operations, comprising applying, to the data to be unmasked, an inverse circular permutation, a number of times conditioned by the same third random quantity before or after applying, in an inverse order, the same first and second operations conditioned by the same first and second random quantities.

The present invention also provides a circuit for masking a digital word by application of a random bijection, comprising:

at least one generator of at least one random quantity;

at least one storage element; and at least one calculation unit capable of implementing all or part of the operations.

According to an embodiment of the present invention, the calculation unit comprises a cell in wired logic dedicated at least to the first operation.

According to an embodiment of the present invention, the same cell is used for the unmasking.

The foregoing objects, features, and advantages of the present invention, as well as others, will be discussed in detail in the following non-limiting description of specific embodiments in connection with the accompanying drawings.

DETAILED DESCRIPTION

Figure 1:
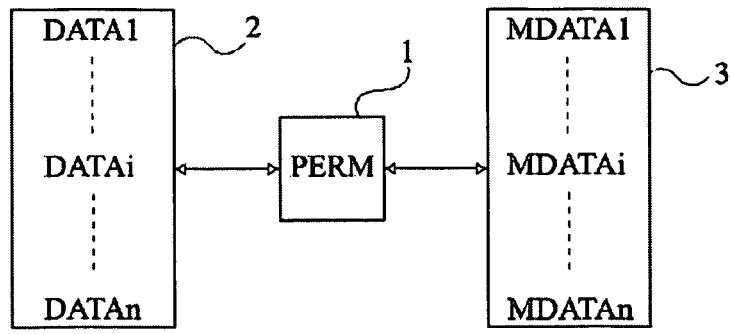
FIG. 1 very schematically illustrates in the form of blocks a bijective permutation system to which some embodiments apply.
Figure 2:
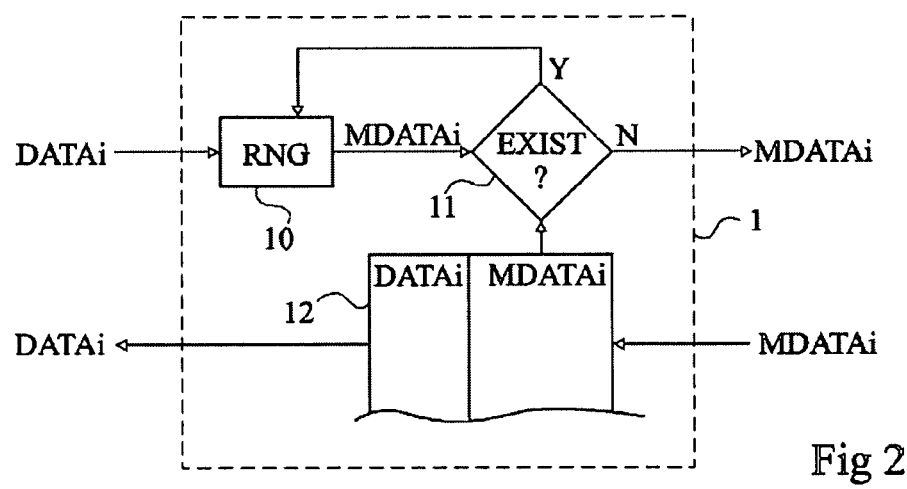
FIGS. 2 to 3, previously described, are intended to show the state of the art and the problem to solve.

The same elements have been designated with the same reference numerals in the different drawings. For clarity, only those elements and method steps which are necessary to the understanding of the present invention have been shown in the drawings and will be described hereafter. In particular, what exploitation is made of the binary words manipulated by the method of the present invention has not been described in detail, the present invention being compatible with any conventional algorithmic processing in which at least certain data that it manipulates are desired to be protected.

The present invention more specifically applies when data are manipulated by an integrated circuit and implement one or several secret quantities which are desired to be protected against possible hackings. Such hackings are currently designated as DPA (differential power analysis) or SPA (simple power analysis) attacks. DPA attacks analyze the power consumption of an integrated circuit based on assumptions made on the manipulated secret quantities, to discover them.

Other attacks known as DFAs (differential fault analysis) attacks consist of cryptographically exploiting a fault injection in the circuit to discover the manipulated secret.

Protections against such hacking attempts very often use bijective permutations to mask the quantities to be protected.

A first example of application of the present invention relates to the temporary storage of a key or secret quantity in a register while this key has to be manipulated by a cryptography algorithm or the like.

Another example of application of the present invention relates to the temporary storage of data in a memory external to a processor processing these data. In such an application, it is often desirable for the data not to be stored "in the clear" in the temporary external memory accessible by a possible hacker.

Another example of application of the present invention relates to the masking of the addresses in which critical data are stored. In this example, it is not the actual data, but its address (then considered as the binary word to be masked) which undergoes a bijective permutation to make the discovery of the data more difficult.

Another example of application of the present invention relates to the masking of the order of the reading of a program code. In this example, the successive address of call to the program functions are masked so that the code is not executable without knowing the elements of the bijective permutation having enabled its storage. In such an example, the storage of the masked data is then generally performed in the non-volatile memory.

More generally, the present invention applies as soon as data or binary quantities need masking to directly or indirectly protect a secret quantity.

FIG. 1 very schematically shows in the form of blocks a bijective permutation system to which the present invention applies.

The principle is, by means of a generally random bijection (block 1, PERM), to transform data words DATAi (i ranging between 1 and n) of a first set 2 into protected or masked words MDATAi of a second set 3. For the permutation to be exploitable, it must perform a bijective transformation, that is, to each piece of data DATAi corresponds one and the same masked piece of data MDATAi and, preferably, the application of the same transformation operation (involutional operation) enables finding, from data MDATAi, data DATAi. If the operation is not involutional, an inverse operation is used to find the original data.

In a system to which the present invention applies, the transformation is performed by one or several digital processing circuits, for example, of microprocessor or wired logic dedicated circuit type.

Figure 4:
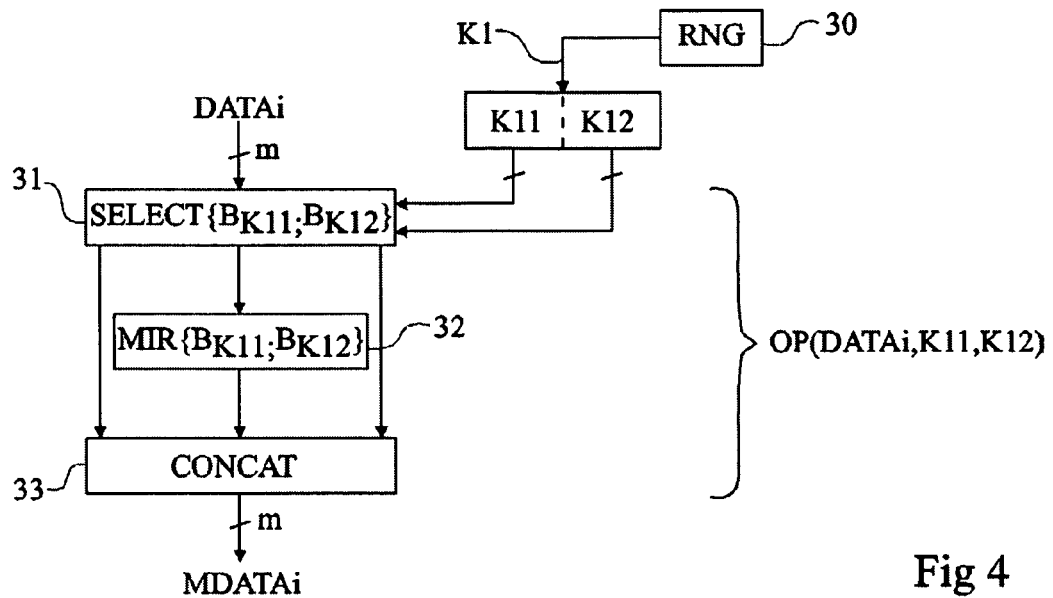
FIG. 4 very schematically illustrates in the form of blocks an embodiment of the method for obtaining a random bijective transformation exploiting an involutional operation according to the present invention.

FIG. 4 very schematically illustrates in the form of blocks an embodiment of a bijective and involutional transformation operation OP according to an embodiment of the present invention. This operation is intended to be applied alone or combined with other operations which will be described hereafter, according to the number of possible desired bijections and according to the involutional or not character desired for the general transformation.

Operation OP specific to the present invention comprises assigning, to each bit of a subset $\{B_{K11}; B_{K12}\}$ of binary word DATAi to be masked, the state of the bit of symmetrical position with respect to the middle of the subset. The subset considers the successive bits and is defined, in position and in size in word DATAi, by a random quantity. FIG. 4 is a simplified flowchart of the successive steps implemented to mask a binary word DATAi in a binary word MDATAi, both over m bits, by means of this operation.

Operation OP(DATAi, K11, K12) involves a representation of the symmetry defined, for example, by quantities K11 and K12 which designate the respective positions (ranging between 1 and m) of the ends of subset $\{B_{K11}; B_{K12}\}$. As an alternative, quantities K11 and K12 designate the position of the first bit and the length of the subset.

The representation of the operation results, for example, from a selection from a table based on a random quantity K1, the selected representation containing the subset parameters. Thus, each representation in the table is unique by the concerned subset of the data word. This table contains $2^{m-1}$ representations of the operation and is stored once and for all (for example, in a non-volatile memory on manufacturing of the circuit). It indeed does not need be generated each time.

Quantity K1 is, for example, drawn by a generator 30 (RNG) for each need for a new bijection, for example, on each powering-on of the circuit manipulating the data, on each new execution of a cryptography algorithm (for example, of DES or AES type), etc. As an alternative, quantity K1 defines two parameters K11 and K12 of a software instruction.

A first step (block 31, SELECT{$B_{K11}$; $B_{K12}$}) of the operation shown in FIG. 4 comprises selecting a subset of bits in word DATAi.

A second step (block 32, MIR{$B_{K11}$; $B_{K12}$}) comprises assigning, to each bit of the subset {$B_{K11}$; $B_{K12}$}, the state of the bit of symmetrical position with respect to the middle of this subset. This amounts to performing a transformation of mirror type on the subset of word DATAi.

A last and third step (block 33, CONCAT) comprises completing the obtained subset with the non-assigned bits of initial word DATAi. In practice, this step corresponds to writing into a register (or any other storage element) containing data DATAi, the bits of subset {$B_{K11}$; $B_{K12}$} resulting from the second step.

An advantage of the mirror operation of the present invention is that it respects the bijective character of the transformation, that is, for same data DATAi, two different random drawings of quantity K1 will provide two different masked data.

Another advantage of the operation of the present invention is that it is involutional, that is, that the application of the same operation (with the same quantities K11 and K12) to masked data MDATAi enables finding data DATAi. This considerably simplifies the implementation of the unmasking function, since the same hardware operators may be used for the masking and the unmasking.

The number of possible bijections with the operation described in relation with FIG. 4 is equal to $2^{m-1}$, that is, for 8 bits, $2^7$.

The operation of the present invention may be executed by a microprocessor or by a dedicated cell in wired logic of an integrated circuit. In this last case, the same cell may be used for the unmasking.

Figure 5:
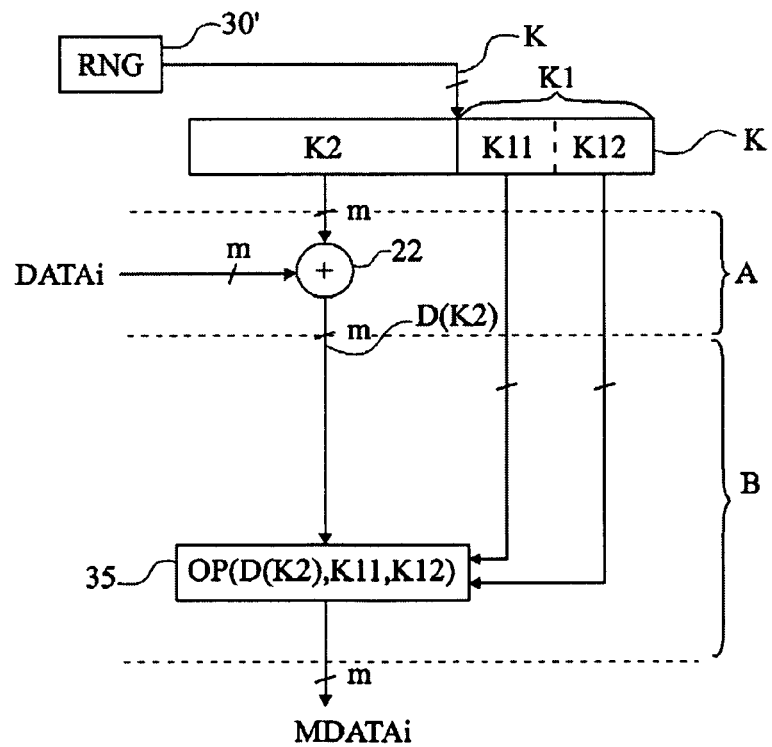
FIG. 5 very schematically illustrates in the form of blocks a first example of application of the transformation of the present invention.

FIG. 5 illustrates a first example of application of the mirror operation according to the present invention.

According to this example, two phases A and B are executed successively. These phases are conditioned by random quantities, respectively K2 and K1 drawn, for example, by a generator 30'.

A first phase A of the example of FIG. 5 comprises applying an XOR function (block 22, +) to input DATAi with a quantity K2. Quantity K2 accordingly is an m-bit word like the manipulated data DATAi.

Data D(K2) resulting from combination 22 are submitted to a second phase B corresponding to operation OP(D(K2), K11, K12). The output data are over m bits.

An advantage of the present invention is that it considerably increases the number of possible bijections while guaranteeing that the successive combined transformations determine one and the same bijection by combination.

Figure 3:
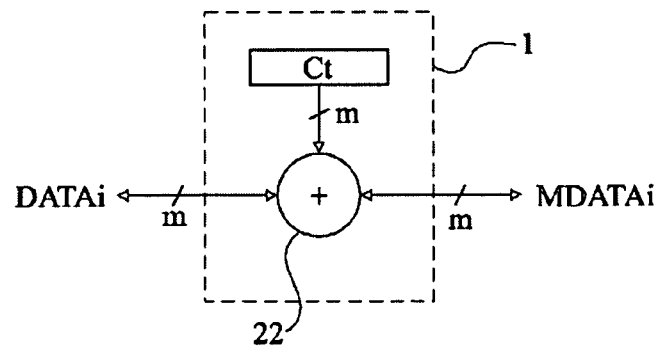

According to the present invention, the number of possible bijections in the example of FIG. 5 is equal to $2^{2m-1}$, that is, for 8 bits, $2^{15}$ which are to be compared with the $2^8$ possible bijections with the conventional method of FIG. 3.

Taking a numerical example, assume a data word DATAi of 8 bits 01101101 (109) and a quantity K corresponding to 100111100101101 (K2=10011110, K11=010, K12=110). It can thus be seen that, to transform eight-bit words, this embodiment requires a random quantity K of 15 bits.

The application of first phase A of XOR combination of data DATAi with quantity K2 (10011110) results in word D(109)=11110011, that is, value 243.

Phase B applies a symmetry to the subset defined by terminals K11 and K12 (here, 010, and thus 2, and 110, that is, 6). Assuming the respective positions of the bits in the word to be counted from 0 to 7, this transformation results in modifying neither the first two bits 11, nor last bit 1 of the word D(109) and in applying a symmetry to all the other bits 11001. Word MDATAi having bits 11100111, that is, masked data of value 231, is thus obtained.

The recovery of data MDATAi requires execution of the same phases B and A but in the inverse order. It is started from data MDATAi corresponding to 11100111, which are submitted to a symmetry over its five bits of ranks 2 to 6 (10011) to obtain value 11110011. This value is combined with value K2 (10011110) to provide data word DATAi 01101101.

Figure 6:
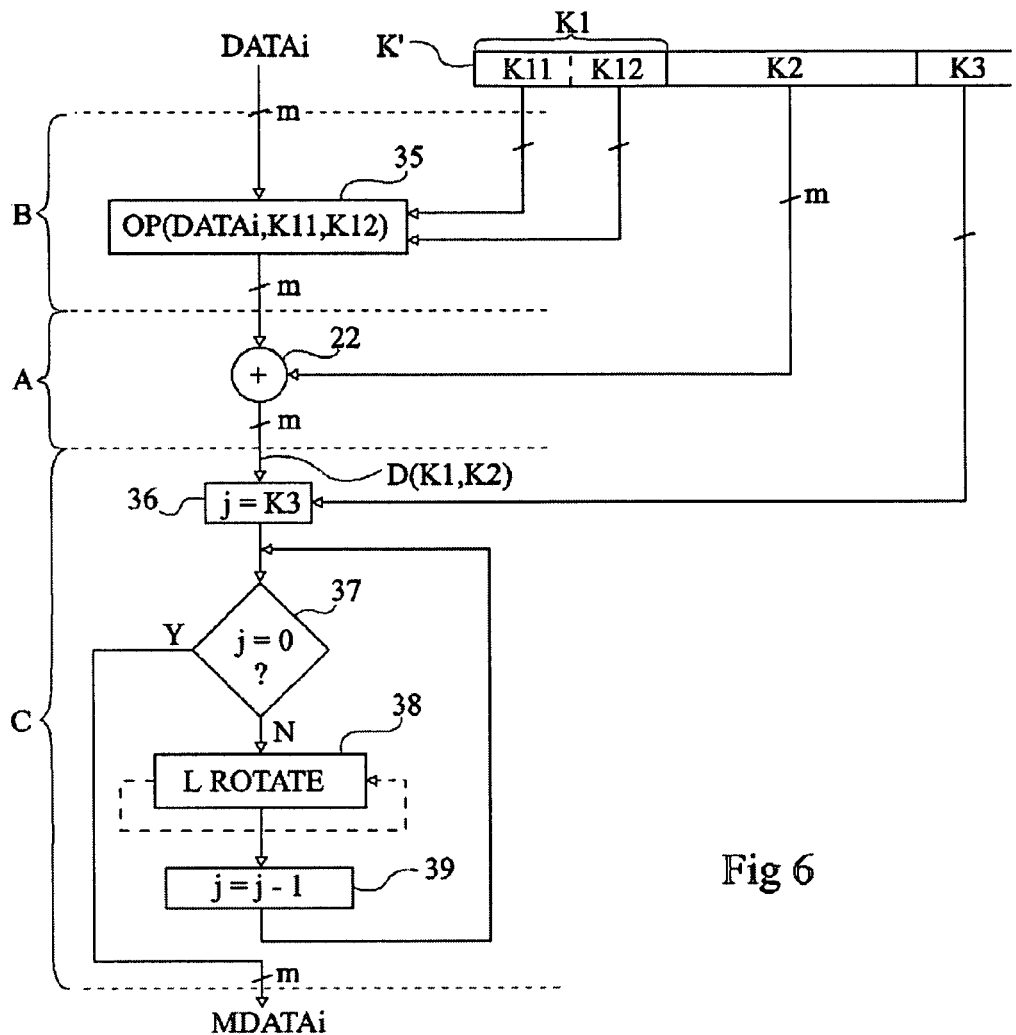
FIG. 6 very schematically illustrates in the form of blocks a second example of application of the present invention.

FIG. 6 very schematically illustrates in the form of blocks a second example of application of the mirror operation according to the present invention.

This example is divided in three successive phases, among which phases A and B discussed in relation with FIG. 5. However, the order is reversed to illustrate a variation.

Thus, two first phases, conditioned by random quantities K1 and K2, are applied to data DATAi to be masked.

Data D(K1, K2) resulting from phases B and A are submitted to a third phase C which comprises executing a circular permutation on the bits of the m-bit word D(K1, K2). This circular permutation or rotation is performed on a number of bits corresponding to the value of a third random quantity K3. In other words, the rotation is a rotation by one bit each time, executed from 0 to m−1 times according to random quantity K3. Quantity K3 accordingly is a number over $\log_2(m)$ bits, that is, for 8-bit data words, 3 bits.

For example, a counter j (block 36, j=K3) is initialized with value K3. The counter state is then compared with the zero value (block 37, j=0 ?). As long as counter j has not reached the zero value (output N of test 37), the process carries on with a rotation (block 38, LROTATE) by one bit of word D(K1, K2) and the counter is decremented by one unit (block 39, j=j−1) before returning to the input of test 37. As soon as the counter reaches 0 (output Y of test 37), the modified data are provided and form masked data MDATAi over m bits.

A transformation such as illustrated in FIG. 6 respects the bijection criterion and enables a number of possible bijections equal to $2^{2m-1}+\log_2(m)$, that is, for 8 bits, $2^{18}$ which are to be compared with the 28 possible bijections with the conventional method of FIG. 3.

Figure 7:
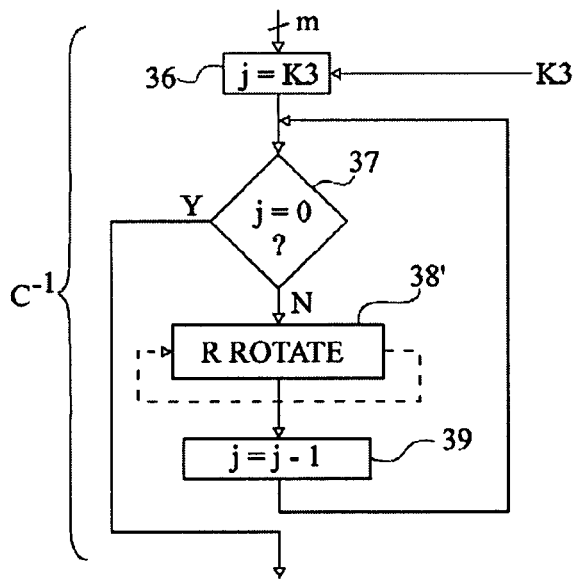
FIG. 7 very schematically illustrates in the form of blocks an embodiment of an operation inverse to an operation of the embodiment of FIG. 6.

FIG. 7 illustrates an embodiment of the phase $C^{-1}$ inverse of rotation phase C, enabling unmasking of data MDATAi.

To obtain the unmasked data, it is enough to apply a rotation in the reverse direction (block 38', RROTATE) over the same number K3 of bits. For an implementation in accordance with the example of FIG. 6, the same steps 36, 37, and 39 are implemented, and only the actual rotation step changes in its rotation direction.

Phase $C^{-1}$ is to be implemented in a reverse order with respect to phase C. In other words, if phase C is the last one of the masking, phase $C^{-1}$ must be the first one of the unmasking.

In the example of FIGS. 6 and 7, a masking by a leftwards rotation and an unmasking by rightwards rotation have been assumed, the inverse being of course possible.

An advantage of the present invention is that is considerably increases the number of possible bijections while guaranteeing that the three successive combined transformations determine one and the same bijection by combination.

Another advantage of the present invention is that its implementation requires neither the storage in a volatile memory of a table recalculated each time, nor a complex transformation. Simple bit manipulations are required.

The random quantities are drawn each time a new bijection is needed. In other words, a random quantity K or K' having its size representing the sum of the sizes of individual random quantities K1 and K2, or K1, K2, and K3 is drawn, for example, on each powering-on of the circuit manipulating the data. This random quantity, that may be assimilated to a temporary key, is stored in a register, the respective bits of which can be read by subsets.

According to a variation, rather than drawing a single random quantity K or K', several distinct quantities are randomly drawn and stored in one or several registers.

Of course, the present invention is likely to have various alterations, modifications, and improvements which will readily occur to those skilled in the art. In particular, the practical implementation of the present invention is within the abilities of those skilled in the art based on the functional indications given hereabove by using conventional software and programming tools. For example, a circuit according to an embodiment of the present invention comprises at least one generator of at least one random quantity, at least one storage element for storing this random quantity, and at least one calculation unit. If the representations of the first operation are stored in the form of a table, the circuit also comprises a non-volatile memory containing this table. As an alternative, all processings are performed by a microcontroller.

Further, the adaptation of the respective sizes of the drawn random quantities to the number of bits of the words to be masked depends on the application and is within the abilities of those skilled in the art, the example over eight bits being a preferred example.

Further, several mirror operations (35) over different subsets may be performed in a row, interleaved or not with other XOR combination and circular permutation operations.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for masking a digital word by application of a random bijection, comprising:
    applying a first operation to said word, the first operation comprising acts of:
        selecting, by a computing device, a subset of said word, the selected subset comprising a plurality of successive bits and having a position and a size depending on a first random quantity;
        assigning, by the computing device, to each bit of the selected subset a state of a bit in the selected subset having a symmetrical position with respect to a middle of the selected subset; and
        concatenating unselected bits of the digital word with the assigned bits of the selected subset, to obtain a result of the first operation;
    applying a second operation to the result of the first operation, the second operation comprising a bit-to-bit combination by an XOR function of the result of the first operation with a second random quantity, to obtain a result of the second operation; and
    applying a third operation to the result of the second operation, the third operation comprising a circular permutation of the result of the second operation a number of times based on a third random quantity, to obtain a masked digital quantity.

2. The method of claim 1, wherein said first random quantity is used to select a representation of the first operation in a stored table, each representation in the table being unique to the subset of the word.

3. The method of claim 2, wherein said table contains, for an m-bit word, $2^{m-1}$ representations of the first operation.

4. The method of claim 1, wherein said third random quantity comprises, for an m-bit word, $\log_2(m)$ bits.

5. A method for unmasking digital data masked by the method of claim 1, comprising applying, to the digital data to be unmasked, the first operation conditioned by the first random quantity.

6. A method for unmasking digital data masked by the method of claim 1, comprising applying, by the computing device, in an inverse order, the first and second operations conditioned by the first and second random quantities.

7. A method for unmasking digital data masked by the method of claim 1 comprising applying, by the computing device, to the data to be unmasked, an inverse circular permutation, a number of times conditioned by the third random quantity before or after applying, in an inverse order, the first and second operations conditioned by the first and second random quantities.

8. A circuit for masking a digital word by application of a random bijection, comprising:
    at least one generator of at least one random quantity;
    at least one storage element; and
    at least one calculation unit configured to implement all or part of the acts of claim 1.

9. The circuit of claim 8, wherein the calculation unit comprises a cell in wired logic dedicated at least to the first operation.

10. The circuit of claim 9, wherein the cell is further used for unmasking.

11. A method for masking a digital word, comprising:
    applying a first operation to the digital word, the first operation comprising:
        selecting, by a computing device, a subset of successive bits of said digital word, a position and size of the selected subset in the digital word depending on a first random quantity;
        assigning, by the computing device, to each bit of the selected subset a state of a bit in the selected subset having a symmetrical position with respect to a middle of the selected subset, thereby performing a mirror type transformation on the selected subset; and
        concatenating unselected bits of the digital word with the assigned bits of the selected subset, to obtain a result of the first operation;
    applying a second operation to the result of the first operation, the second operation comprising a bit-to-bit combination by an XOR function of the result of the first operation with a second random quantity, to obtain a result of the second operation; and
    applying a third operation to the result of the second operation, the third operation comprising a circular permutation of the result of the second operation a number of times based on a third random quantity, to obtain a masked digital word.

12. A method as defined in claim 11, wherein selecting comprises using the first random quantity to select parameters of the subset from a table.

13. A method as defined in claim 11, further comprising unmasking the masked digital word by applying to the masked digital word the first operation using the first random quantity.

14. A method as defined in claim 11, further comprising unmasking the digital word by applying an inverse circular permutation a number of times based on the third random quantity before or after applying, in inverse order, the first and second operations based on the first and second random quantities.

15. Apparatus for masking a digital word, comprising:
- a random generator to generate first, second and third random quantities;
- a storage element to hold the first, second and third random quantities; and
- a calculation circuit to apply a first operation to the digital word, the first operation comprising selecting a subset of successive bits of said digital word, a position and size of the subset in the digital word based on the first random quantity, assigning to each bit of the subset, a state of a bit in the subset having a symmetrical position with respect to a middle of the subset, thereby performing a mirror type transformation on the selected subset, and concatenating unselected bits of the digital word with the assigned bits of the selected subset, to obtain a result of the first operation; to apply a second operation to the result of the first operation, the second operation comprising a bit-to-bit combination by an XOR function of the result of the first operation with a second random quantity, to obtain a result of the second operation; and to apply a third operation to the result of the second operation, the third operation comprising a circular permutation of the result of the second operation a number of times based on a third random quantity, to obtain a masked digital word.

\* \* \* \* \*